United States Patent [19]

Khalafalla

[11] Patent Number: 4,910,010
[45] Date of Patent: Mar. 20, 1990

[54] METHOD FOR ACCELERATING RECOVERY OF SELENIUM FROM AQUEOUS STREAMS

[76] Inventor: Sanaa E. Khalafalla, 2551 37th Ave. South, Minneapolis, Minn. 55406

[21] Appl. No.: 264,031

[22] Filed: Oct. 27, 1988

Related U.S. Application Data

[63] Continuation-in-part of Ser. No. 28,376, Mar. 20, 1987, abandoned.

[51] Int. Cl.$^4$ .................. C01B 19/00; C01B 19/04; C02F 3/00
[52] U.S. Cl. .................................. 423/508; 423/659; 423/DIG. 17; 210/611; 210/616; 210/911
[58] Field of Search ........ 423/508, 509, 510, DIG. 17, 423/659; 210/611, 616, 913, 911

[56] References Cited

U.S. PATENT DOCUMENTS

| | | | |
|---|---|---|---|
| 3,178,257 | 4/1965 | Hart | 423/510 |
| 3,433,596 | 3/1969 | Wagenmann | 423/510 |
| 3,959,097 | 5/1976 | Queneau et al. | 423/508 |
| 3,986,839 | 1/1976 | Kakuta et al. | 423/510 |
| 4,083,924 | 4/1978 | Styring | 423/509 |
| 4,405,464 | 9/1983 | Baldwin et al. | 423/509 |
| 4,519,912 | 5/1985 | Kauffman et al. | 210/611 |
| 4,519,913 | 5/1985 | Baldwin et al. | 210/611 |

FOREIGN PATENT DOCUMENTS

87/00161 1/1987 World Int. Prop. O. .......... 423/508

OTHER PUBLICATIONS

Byer et al, Selenium in Hawaii & its probable occurance in the United States, I&EC Jul. 36, vol. 28 #7 pp. 821–823.
Williams et al, Selenium compounds in soils I&EC vol. 28 #8 Aug. 36, pp. 912–914.

*Primary Examiner*—Gary P. Straub
*Attorney, Agent, or Firm*—Jerome J. Norris

[57] ABSTRACT

The invention provides a method for accelerating the removal and recovery of selenium from aqueous solutions, such as agricultural irrigation drainage streams or mine waste waters by the bioreduction of Se(VI) to Se(IV) species by using Clostridium soil bacteria together with a rapid exchange reaction which occurs between the aqueous selenium species selenous acid ($H_2SeO_3$) and pyrite ($FeS_2$) to remove all forms of selenium from the aqueous solution. The exchange reaction product FeS.Se may be treated with dilute mineral acid such as sulfurous acid to generate hydrogen selenide ($H_2Se$), which is burned in air to yield free selenium. The free selenium recovered is available for use in the electronics, photocopying equipment and other industries. A reusable bacteria-containing soil and pyrite filter apparatus for installation in drainage canals and other conduits is additionally provided to facilitate the removal of aqueous selenium pollutants.

8 Claims, 2 Drawing Sheets

METHOD FOR ACCELERATING RECOVERY OF SELENIUM FROM AQUEOUS STREAMS

The invention relates to methods of removing selenium from agricultural irrigation drainage streams as well as mining waste waters, and is a continuation-in-part of U.S. application Ser. No. 07/028,376, filed Mar. 20, 1987, now abandoned.

BACKGROUND OF THE INVENTION

1. Field of the Invention

The creation of arable land in dry, desert-like areas such as the Southwestern U.S. has been achieved primarily through the construction of extensive irrigation systems. Streams of water are diverted from a variety of sources to supply a vast network of drainage ditches which direct water to fields, orchards and groves where it is required to sustain the food-producing crops planted there. One unfortunate side effect of the widespread use of irrigation systems is the leaching into the irrigation streams of substances like inorganic salts and heavy metals which can be highly toxic. When the subsoil in any irrigation area includes an impermeable clay layer, excessive irrigation water tends to accumulate if specific provisions are not made for drainage. If the toxic leachate-containing water is not removed, the roots of the irrigated plants will be waterlogged therein and not likely to survive, thereby, resulting in lower agricultural productivity.

However, evaporation and irrigation ponds which have been constructed to improve drainage of toxic leachate-containing water is hazardous to wildlife, as shown by birth defects and high rates of fetal mortality among water fowl which feed and nest in ponds having unacceptably high concentrations of selenium (Se) in the water.

While selenium is a naturally occurring trace element in soil, it becomes highly toxic when concentrated as it has been in recent years in irrigation drainage streams and ponds, and can pose significant dangers to humans and animals if irrigation drainage and evaporation ponds are positioned to allow seepage of selenium-containing drainage water into ground water or other sources of drinking water.

2. Description of the Prior Art

One method of removing selenium as selenate ions from an aqueous solution such as a leaching or mine drainage operation prior to discharge of water into the drinking supply is described in U.S. Pat. No. 4,405,464 to Baldwin et al. This method employs metallic iron in a reduction vessel to reduce the concentration of selenate (Se(VI)) ions to selenite (Se(IV)) ions at a carefully controlled pH, and the ferric hydroxide produced during the reduction must be removed in a separate step. This method, however, does not provide an efficient and effective way to remove selenium from agricultural irrigation drainage systems. Further, this method of removing selenium is too costly for widespread application to an extensive irrigation drainage system, and the method does not contemplate recovery of the removed selenium which is a valuable element.

Activated ferric hydroxide can also be used to remove toxic metals such as selenium from water by a combination of absorption and adsorption, however, this method is costly and too slow to handle the high flow rates likely to be encountered in natural streams and applies only for Se(IV) oxidation state and not for Se(VI).

Methods of removing selenium from non-aqueous systems are also known in the art. For example, U.S. Pat. Nos. 3,876,663 and 3,933,624 to Myers teach removal of selenium from hydrocarbonaceous materials such as synthetic fuels, however, these methods are described to be specifically inapplicable to aqueous solutions.

A method of removing selenium from aqueous solutions containing molybdenum and rhenium is described in U.S. Pat. No. 3,848,069 to Carey et al and employs a series of steps which include a liquid-liquid solvent extraction, which are not suited for detoxification of bodies of water like agricultural drainage streams. Similarly, a precipitation method of removing selenium from acidic waste water like zinc smelter effluent is disclosed in U.S. Pat. No. 3,933,635 to Marchant but the method is not suitable for removing aqueous selenium species from drainage streams.

Other methods for removing selenium from aqueous solution, such as the selenium removal from copper sulfate solutions taught in U.S. Pat. Nos. 4,222,999 and 4,330,508 to Weir et al requires the selenium to be present in solution in the tetravalent oxidation state, and this state may or may not be the case when selenium is found in agricultural drainage streams; therefore, these methods would not be universally applicable for treating all such streams to remove selenium.

Still further methods of removing selenium from smelter gases are known in the art, and U.S. Pat. No. 4,242,124 to Makipirtti is exemplary thereof, however, these methods are not applicable for removal of selenium species from aqueous drainage streams.

Consequently, the prior art lacks a fast, inexpensive and efficient method for removal of selenium from an aqueous stream specifically likely to be encountered from an agricultural irrigation drainage system and which subsequently permits easy recovery of the removed selenium values.

Finally, it is known that bacteria of the genus Clostridium in a closed system under anaerobic conditions or in an environment having a substantial absence of free atmospheric oxygen can reduce the concentration of water soluble selenium ions in aqueous solution; however, the process leaves much to be desired in both the selenium removal rates as well as the length of time required to reduce the amount of selenium in solution. This method is disclosed in U.S. Pat. No. 4,519,913 to Baldwin et al.

SUMMARY OF THE INVENTION

It is an object of the invention to provide a method for easily removing selenium from agricultural irrigation and other water drainage streams and bodies of water at an efficient rate over a shorter period of time to recover selenium in a usable form.

Another object of the invention is to provide anaerobic conditions for accelerating the action of anaerobic bacteria for swifter removal of selenium from drainage waters.

A still further object of the invention is to provide a method for removing and recovering selenium by filtering a solution containing the same to obtain a selenium exchange product, treating the exchange product to produce a selenium containing gas; and burning said gas in air prior to condensing metallic selenium on a cold surface.

In accordance with the aforesaid objectives, the method of the present invention employs the bioreduction of selenium species by employing bacteria of the genus Clostridium in a closed environment under anaerobic conditions in conjunction with a very fast exchange reaction discovered to occur between pyrite ($FeS_2$) and an aqueous solution of selenous acid ($H_2SeO_3$) to produce an exchange reaction product (FeS.Se) which is treated with a dilute mineral acid, such as sulfurous to generate gaseous hydrogen selenide ($H_2Se$). Free selenium is then recovered from the hydrogen selenide gas. The present invention further provides a replaceable filter containing a predetermined volume of soil containing at least one species of the genus Clostridium bacteria and crushed pyrite mineral which can be installed in a drainage canal or other conduit. The exact size of the filter can be determined by achieve maximum efficiency in the removal of selenium from the water by determining the reaction rate between the selenium species to be removed and pyrite and the flow rate of the water stream to be treated.

Other objectives and advantages will become apparent from the following description, drawings and appended claims.

DETAILED DESCRIPTION OF THE INVENTION

Figure 1:
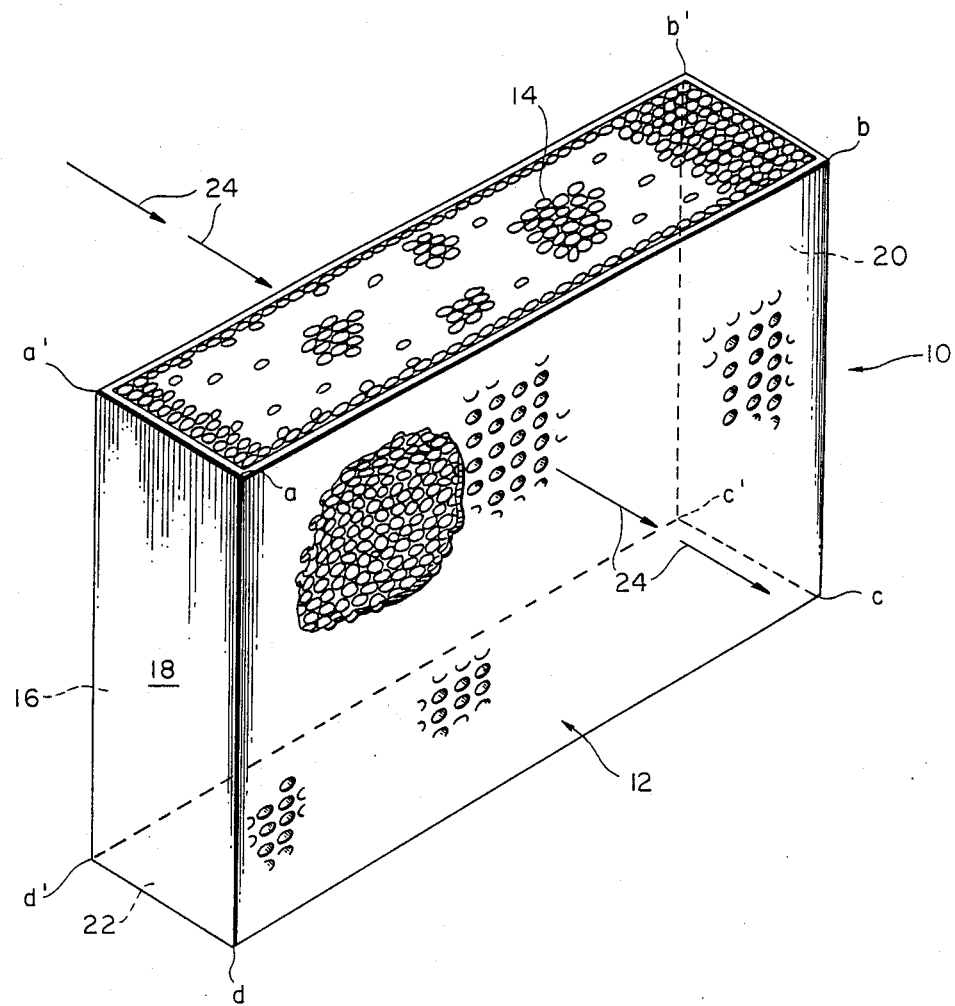
FIG. 1 is a perspective view of the filter according to the present invention.

The method of the invention provides a quick, inexpensive and efficient way to remove selenium, which is an element of great importance to the electronics industry, from irrigation and other drainage streams where its toxicity to living organisms may reach life-threatening levels. The process discovery is that pyrite can be employed together with selenium-ingesting bacteria from the genus Clostridum to accelerate selenium removal. Thus, it is now possible to utilize one pollutant (pyrite) in the removal of another pollutant (selenium) to achieve both a clean environment and a profit.

An exchange reaction between pyrite ($FeS_2$) and an aqueous solution of selenous acid ($H_2SeO_3$) was discovered to occur very quickly. This exchange reaction is the primary basis for the passive selenium removal system. Pyrite is one of the most abundant minerals on earth, and the accumulation of pyrite in the U.S. is expected to reach unheard of amounts as a result of the proposed mining of new mineral deposits. For example, the mining of a new zinc deposit in Wisconsin and the Duluth Gabbro ores of Minnesota is anticipated to create large quantities of pyrite. In addition, the mining of offshore sulfide crusts is expected to produce an abundance of pyrite. The invention provides a solution for efficiently using this abundance, which has the potential to despoil large land areas where mining operations are carried out.

Selenium is present in aqueous solutions found in agricultural irrigation drainage streams, in water soluble selenium speciations. Selenous acid or $H_2SeO_3$ is a commonly encountered aqueous species of the selenium. The exchange reaction between pyrite and selenous acid is believed to produce the compound FeS.Se as a reaction product for the following reasons. Pyrite is the salt of hydrogen disulfide ($H_2S_2$). The $MX_2$ type of sulfide mineral, of which pyrite is an example, is classified into several groups. Of these groups, the isometric minerals of the pyrite and cobaltite groups are related structurally and chemically. While it is possible to form crystals having the pyrite structure from a large number of substances in which the X may be sulfur (S), selenium (Se), tellurium (Te), arsenic (As) or tin (Sb), the naturally occurring $MX_2$ compounds of this type are predominately sulfides. The sulfides are thermodynamically more stable than the corresponding selenides due to their lower free energies. However, pyrite is unusual in that an extra sulfur atom is exposed, and it is believed that this sulfur atom exchanges rapidly with selenium in aqueous solution. Given the choice between either sulfur or selenium, the iron atom will undoubtedly prefer sulfur to selenium, but the presence of the extra sulfur atom in pyrite affords the iron atom the opportunity to feast on both sulfur and selenium. The exchange reaction is:

$$FeS_2 + H_2SeO_3 \rightleftharpoons FeS.Se + H_2SO_3$$

The reaction product FeS.Se can be treated to recover elemental selenium in a useful form. The reaction of FeS.Se with dilute acid generates hydrogen selenide ($H_2Se$). Although $H_2Se$ might be expected to behave like $H_2S$ and yield water and selenium dioxide ($SeO_2$) when burned in air, this is not the case. The energy barrier for the formation of $SeO_2$ is too high and, instead the burning of $H_2Se$ proceeds as in the following equation to produce water and free selenum.

$$2H_2Se + O_2 \rightarrow H_2O + 2Se$$

Thus, selenium metalloid is deposited by condensing the ignited $H_2Se$ gas on a cold surface. The selenium thus recovered is available for such diverse uses as in photoelectric cells, photocopying machines, photovoltaic cells and color televisions.

While the reaction between pyrite and the selenite species just described removes the selenium from many kinds of drainage waters, it has been found to be ineffective in removing all of the selenium species likely to be present in certain agricultural drainage waters. If the selenium is present in the form of selenate species ($SeO_4^{-2}$) rather than selenite species ($SeO_3^{-2}$), the selenate is not removed by pyrite. Although the precise reasons for this is not known, it is hypothesized that the sterically protected Se(VI) in selenate, which is tetrahedrally surrounded by four oxygen atoms, cannot be readily exchanged with the free surface sulfur in pyrite. Because the Se(IV) in selenite is triagonally surrounded by only three oxygen atoms, it appears to be open for attack on a line perpendicular to the oxygen triangle by the pyrite surface sulfur. Consequently, selenium in the form of selenite species in readily removed from aqueous streams by pyrite.

Although Se(VI) is thermodynamically vulnerable to reduction to Se(IV), it is kinetically inert. This is to be expected because Se(VI) is tetrahedrally coordinate to four oxygen atoms in selenates, and is sterically protected from chemical attack despite its thermodynamic vulnerability. Reduction of Se(VI) to Se(IV), therefore, is chemically difficult requiring high temperature refluxing with mineral acids and can only be achieved at room temperature by biological or enzymatic means.

The invention discovery is that the selenate species not removed from aqueous drainage strems by pyrite alone can be removed effectively through bioreduction by selenium-ingesting bacteria in soil. Bacteria of the genus Clostridium are capable of reducing selenate ($SeO_4^{2-}$) ions to selenite ($SeO_3^{2-}$) ions and, ultimately, to elemental selenium. Unfortunately, the bioreduction of selenate to elemental selenium by Clostridium bacteria proceeds very slowly, and elemental selenium is not actually removed from the drainage stream by the process. If, however, the capability of the Clostridium bacteria to reduce selenate to selenite is combined with the capability of pyrite to remove selenium in the form of selenite from aqueous streams, substantially all of the selenium species found in agricultural run-off can be effectively removed.

The Clostridium bacteria useful in the aforementioned bioreduction process are readily available since these bacteria are found in many soils. Consequently, a readily available supply of these organisms, which are constantly being replenished, is already in existence.

Pyrite is one of the most abundant minerals on earth, and pyrite suitable for use in the invention is a component of the sulfide tailings produced during mining operations. It would be possible to achieve a quick solution to the removal of selenium from drainage canal waters simply by interposing piles of sulfide tailings and soil containing Clostridium bacteria between the drainage canals and the final disposal ponds. However, this solution is not the most efficient way to remove selenium from streams. FIG. 1 shows one embodiment of a filter 10 which may be efficiently and effectively employed for this purpose.

The filter 10 of the present invention in its simplest form includes at least two water permeable membranes or plates, only one of which is shown clearly in FIG. 1, sandwiching a core portion 14 containing pyrite mineral, soil and gravel. When a filter is loaded with selenium, it is replaced by a fresh filter and taken to a special treatment station where the metalloid selenium can be recovered as described above. The pyrite may then be regenerated for reuse.

For the maximum removal of aqueous selenium species from a drainage canal or other body of water requiring treatment, it is necessary to assure that a filter of the proper dimensions is provided. If this is not done, the filter will not effectively remove the selenium from the water. The thickness of the filter will be determined primarily by the reaction rate, k, between the Clostridium-pyrite mixture and the predominant selenium species to be removed from the water and the flow rate, F, of the water stream to be treated.

The filter in FIG. 1 includes opposed spaced water permeable plates 12 and 16 separated by a core portion 14. Plate 12 is defined by the perimeter abcd, and plate 16 is defined by the perimeter a'b'c'd'. The cross-sectional area A of plate 12 is identical to the cross-sectional area of A' of plate 16. Distances ab and a'b' and cd and c'd' are determined by the width of the drainage canal or other conduit in which the filter is to be placed. Although plates 12 and 16 have been referred to as water permeable membranes, a variety of different materials may be chosen from which to form plates 12 and 16. The optimum material will be sufficiently rigid to hold the pyrite-soil-gravel core and remain in place in the drainage canal under different water flow conditions, and will be chemically inert and durable in addition to being water permeable. Polystyrene or stainless steel which has been perforated are exemplary of the materials which may be used to form plates 12 and 16. However, other materials which function in the same way are operable within the context of the invention.

Plates 12 and 18 are maintained in the opposed, spaced orientation shown in FIG. 1 by side walls 18 and 20, defined by perimeters aa'dd' and bb'cc', respectively, and by a bottom wall 24 defined by perimeter cdd'c'. The filter of FIG. 1 does not include a top wall, but is open within the perimeter defined by abb'a. Leaving this portion of the filter open facilitates the removal of the selenium-loaded filter material and the addition of fresh filter material. A top wall, however, may be desirable in some applications. Side walls 18 and 20, top wall 22 and bottom wall 24, like plates 12 and 16, should be formed of material which is sufficiently rigid to support the pyrite core 14 as plates 12 and 16, but which is chemically inert and durable. Walls 18, 20 and 22 are preferably not water permeable.

The core portion 14 of the filter is filled with pyrite mineral which has been crushed. The degree to which the pyrite is crushed will depend on the material chosen. The pyrite must not be so finely crushed that it is washed through the plates by the water flowing through the filter, but it must be fine enough to present a large number of reaction sites to the aqueous selenium species flowing through the filter. Pyrite particles of −50 to 100 mesh size have been found to be suitable. Soil containing the Clostridium bacteria is mixed with the pyrite to form the filter core. In addition, gravel, preferably of at least two different sizes to facilitate the distribution of the soil and pyrite is added to form the filter core.

Water flow through the filter in FIG. 1 is shown by arrows 24 and maximum removal of the selenium species in the water is achieved by providing a filter bed in core portion 14 which is calculated so that the thickness t of the filter bed, which is represented in FIG. 1 by the distances aa'=bb'=cc'=dd' is calculated according to the following equation:

$$t = F/kA$$

where t=filter bed thickness, and A=filter cross-sectional area.

The biological removal of selenium can be accelerated by distributing the population of Clostridium bacterial cells in a manner which exposes maximum cell surface area to the solution from which the selenium is to be removed. For example, the immobilization of bacterial cells on clay to produce a biological reactor as taught in U.S. Pat. Nos. 4,407,954 and 4,446,236 can be employed. Alternatively, polyester fibers can be used to immobilize a mixture of pyrite and the population of Clostridium bacteria culture prior to insertion into the filter. Removal of selenium can be speeded up further by providing for the rotation of the pyrite-Clostridium bacteria mixture.

The effectiveness of the selenium removal method of the present invention is demonstrated by the following Examples.

EXAMPLE I

An aqueous solution of selenous acid containing 12.0 parts per million (ppm) selenium is prepared. 100 milliters of this solution is shaken with 2 grams of freshly ground pyrite for 1 minute. The pyrite-selenous acid mixture is filtered and the filtrate analyzed by atomic absorption spectrophotometry. The analysis showed that the filtrate contained 34 parts per billion (ppb) selenium. Atomic absorption analysis of the head solution was also conducted, and aliquots of the head solution gave readings ranging from 11.5 ppm to 12.0 ppm selenium. The efficiency of selenium removal by pyrite at this loading is calculated to be 99.7 percent.

EXAMPLE II

A water sample from the California San Luis Drain, Site 10 (Kesterson Reservoir), was obtained from the Bureau of Reclamation of the U.S. Department of the Interior. The sample contained 3.8 ppm total selenium in the hexavalent oxidation state, Se(VI), and the tetravalent oxidation state Se(IV).

Two adsorption beds, A and B, having the solids composition indicated below in Table I were set up to perform comparative tests A and B.

Two 300 ml. capacity plastic cones were prepared for use in the tests by closing the hold in the 3½ inch base with a rubber stopper into which a small diameter (0.0315 inch bore) Tygon tube was inserted. Over this stopper and tubing a porous matrix support layer of glass wool for the Closterdium bacteria in the soil was pressed into place and taped to the inside of the base to act as a filter to prevent clays from enterng and clogging the water flow in the small bore tubing. The solids and Kesterson Reservoir water were placed in each cone as indicated below, and the base was screwed on the cone, and the cone was shaken briefly inverted to permit the solids to settle on the base. The heavier coarse gravels sunk to the bottom first and the finer particles and clays settled over the coarse fraction. The water was pumped through a peristaltic pump in a downflow direction so that water entered the top of the cone, seeped through the layers of clay and gravel (and in the case of test B, pyrite) to the base of the cone where it was pumped out and recirculated back to the top of the cone. Nutrients naturally present in the water within the treatment provide the energy and other necessaries for cell growth and allow the bacteria to grow and maintain constant population densities in the porous matrix, and nutrients allowing species from the genus Clostridium to grow and maintain constant population densities are any organic carbon containing materials such as ligninsulfonate; however, other organic carbon containing materials such as cellulose organic acids, hydrocarbons, starches, sugars and sludges from waste waters will also suffice in the invention process. Therefore, when these trace nutrients are already present in the water, the addition of these nutrients are unnecessary, and the amount of nutrient present is sufficient if it allows and maintains a large and constant state population of Clostridium bacteria sufficient to provide an effuent having a previously calculated reduced concentration of the selenium ion. The temperature in the test cells were in the range of from about 20° C. to 35°; however, the operable temperature range over which the reaction can take place is from about 0° C. up to the temperature at which growth and maintenance of the population densities of the Clostridium bacteria is capable of removing selenium or a temperature of about 64° C.

Both test cells, A and B, were operated simultaneously under the same conditions. Both were pumped in tandem by the same pump using two pump heads at identical flow rates of approximately 0.75 ml per minute. Both cells were operated under anaerobic conditions and closed to the atmosphere and the cell environment was substantially free of atmospheric oxygen except for the volume of air left in the top of the cones and during the time they were opened to remove water samples for testing.

To determine the selenium concentration in the water in each test cell, a 10 ml. aliquot was taken from each test cell at 3 or 4 day intervals and submitted for AAS analysis. A fresh sample of Kesterson Reservoir Site 10 water was also submitted with the test cell samples to check consistency of analysis. The Site 10 check samples measured 3.8, 4.0, 3.8, 3.8 and 3.8 ppm at one sample per week accompanying the other aliquot samples submitted at the same time.

| Material | Test A without pyrite | Test B with pyrite |
|---|---|---|
| Tulsa soil* | 92.1 g | 92.3 g |
| gravel, −3/8" + 16 mesh | 30.3 g | 30.1 g |
| gravel, −16 + 50 mesh | 60.1 g | 30.1 g |
| pyrite −50 + 100 mesh | — | 30.2 g |
| Site 10 water | 250 ml | 250 ml |
| Total solids mass | 182.5 g | 182.7 g |
| Ratio, pyrite to soil | — | 1:3.06 |

*Tulsa soil refers to a red clayey soil obtained from marshland area near a lake in Tulsa, Oklahoma which contained species of *C. butyricum, c. pasteurianum, c. acidiurici, c. kluyveri* and *c. acetricum* from the genus Clostridium bacteria and about 10.0 grams of hydrocarbons as the nutrient per 90 grams of soil.

Figure 2:
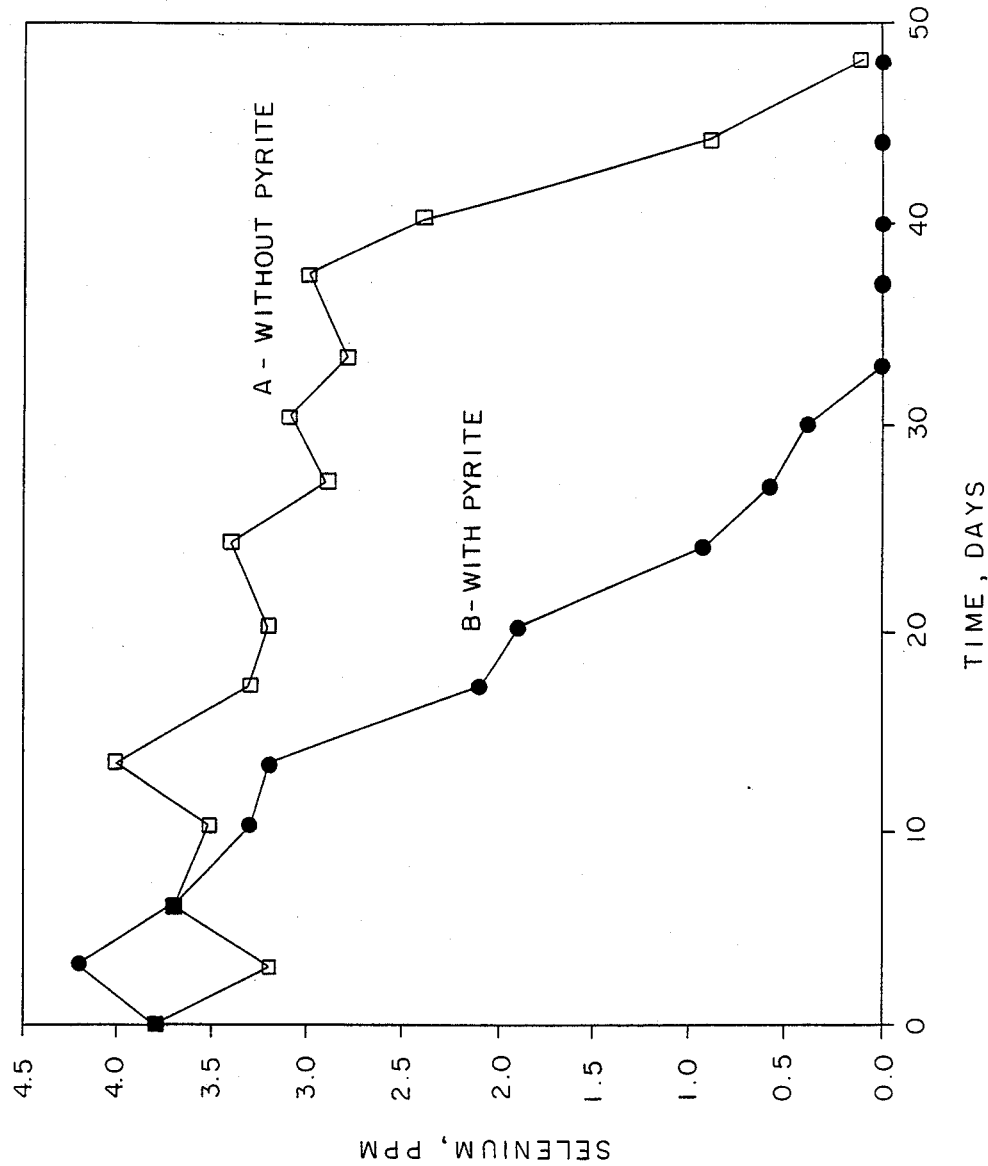
FIG. 2 is a graphic representation of the accelerated selenium removal results achieved by the method of invention versus a process without pyrite.

The results of Tests A and B are depicted graphically in FIG. 2. In the presence of soil bacteria of the genus Clostridium, selenium in Test A was removed from the Kesterson Reservoir water or reduced to levels which could not be detected at days 48 to 52. After an induction period of 13 days, the selenium concentration was slowly reduced to 2.8 ppm at day 33 and to 2.4 ppm at day 40. Rapid reduction of the selenium in the Test A cell then followed and a level of 0.12 ppm was reached in 48 days. Curve A of FIG. 2 reflects the data with the bacterial alone.

In Test B, however, the cell containing pyrite plus bacteria removed selenium from the water much more rapidly than in Test A. Following a much shorter induction time than in Test A, the selenium level was reduced to less than 2.0 ppm on the 20th day and to less than 0.1 ppm on the 33rd day. Thus, removal of selenium was accelerated by almost 40%, following a trend of continual rapid removal almost from the onset of testing. The results of Test B are set forth in Curve B of FIG. 2. The beneficial effect of pyrite plus bacteria can be observed only when Se(VI) is first reduced to Se(IV), a reaction step that apparently takes place after the induction period is completed.

The invention will find its primary application in the clean-up of agricultural irrigation drainage waters where high concentrations of toxic aqueous selenium pollutants threaten both the continued existence of living organisms and the continued arability of agricultural soils. The invention will also prove useful in the detoxification of toxic waste dumps from which selenium is leached. The present invention further provides unique method whereby two environmental pollutants, aqueous selenium and sulfide tailings, may be employed to produce a clean environment and a valuable, salable commodity, selenium. At recently quoted prices for selenium of $10.00 to $10.50 per pound, the method of the present invention may be profitably employed to solve a number of existing environmental problems.

What is claimed is:

1. A method for accelerating removal of substantially all of the selenium species from an aqueous solution under anaerobic conditions at temperatures between about 0° C. to about 64° C., comprising: filtering a selenium-containing aqueous solution through an absorption bed in a cell which is closed to the atmosphere said bed having a solids composition comprising:
a mixture of about:
- Red clay soil—92.3 g
- Gravel,—⅜+16 mesh=30.1 g
- Gravel—16+50 mesh—30.1 g
- Pyrite—50+100 mesh—30.2 g
- Water—250 ml
- Total Solids Mass—182.7 g said soil containing bacteria of the genus Clostridium and a nutrient for said bacteria, to obtain an exchange reaction product of FeS.Se.

2. The method of claim 1, further including the step of treating the mixture containing said exchange reaction product of FeS.Se with a dilute acid to obtain $H_2Se$.

3. The method of claim 2, wherein the dilute acid is sulfurous acid.

4. The method of claim 1, wherein said selenium species in present predominantly as selenate (Se(VI)).

5. The method of claim 1, wherein the pyrite is in the form of a fine powder.

6. The method of claim 1, wherein the action of the anaerobic bacteria is accelerated by the addition of finely divided pyrite mineral soil.

7. The method of claim 3 wherein the hydrogen selenide produced by said sulfurous acid is burned in air to produce free selenium.

8. The process of claim 7, wherein said free selenium is condensed as a metalloid on a cold surface.

* * * * *